United States Patent [19]

Oetzel

[11] 4,251,648
[45] Feb. 17, 1981

[54] PEROXIDE CURED EPIHALOHYDRIN POLYMERS

[75] Inventor: John T. Oetzel, Elyria, Ohio

[73] Assignee: The B.F. Goodrich Company, Akron, Ohio

[21] Appl. No.: 810,654

[22] Filed: Jun. 27, 1977

[51] Int. Cl.³ .............................................. C08G 65/32
[52] U.S. Cl. ........................................ 525/187; 260/3; 260/4 R; 260/18 EP; 260/23 EP; 525/393
[58] Field of Search ............... 260/2 A, 836, 837, 875, 260/885, 830 TW, 18 EP, 23 EP, 3.4 R, 890, 823, 887, 897 R, 897 C; 528/11.2, 15, 50, 261, 393; 525/187

[56] References Cited

U.S. PATENT DOCUMENTS 4,032,479  6/1977  Bunnomori et al. ................ 260/2 A

*Primary Examiner*—Joseph L. Schofer
*Assistant Examiner*—Herbert J. Lilling
*Attorney, Agent, or Firm*—J. Hughes Powell, Jr.

[57] ABSTRACT

Compositions containing copolymers of epihalohydrins, an unsaturated epoxy comonomer, and optionally, ethylene oxide are readily cured to useful articles with peroxides when such compounds contain an acid acceptor. Covulcanizable compositions are prepared from mixtures of the epihalohydrin and epoxy copolymers with peroxy vulcanizable polymers.

23 Claims, No Drawings

PEROXIDE CURED EPIHALOHYDRIN POLYMERS

BACKGROUND OF THE INVENTION

Epihalohydrin polymers are well known commercial elastomers. A particularly useful class of copolymers of those materials are those copolymers of epihalohydrin copolymerized with an alkylene oxide. The curing or vulcanization of such polymers is a problem. Complex curing systems are required to obtain the desired balance of necessary physical properties in a variety of applications. Many of these curing systems can cause mold fouling and are otherwise undesirable. A simple peroxide cure would be advantageous in many applications for vulcanizable polymers of eiphalohydrins or epihalohydrin and alkylene oxides. However, up to now, attempts to cure such polymers with organic peroxides have not been successful because the peroxide free radical attacks the ether linkage of the polymer and initiates degradation before the polymer reaches a satisfactory state of cure.

SUMMARY OF THE INVENTION

Copolymers of epihalohydrin, and unsaturated glycidyl ether and optionally, ethylene oxide may be readily cured to provide vulcanizates with an excellent balance of desirable physical properties when such copolymers also contain a group IA, IIA or IVA acid acceptor compound, and optionally, certain polyfunctional unsaturated compounds.

DETAILED DESCRIPTION

The epihalohydrin monomers useful in preparing the copolymers of this invention include epichlorohydrin, eipbromohydrin, epiiodohydrin, epifluorohydrin and polymers containing two or more of these epihalohydrins. The second required comonomer is an unsaturated glycidyl ether of the general formula

where R is an ethylenically unsaturated radical such as vinyl, allyl, alkenyl and the like. Typical glycidyl ethers include vinyl glycidyl ether, allyl glycidyl ether, butenyl glycidyl ether, 4-vinylcyclohexyl glycidyl ether, abietyl glycidyl ether, cyclohexenylmethyl glycidyl ether, o-allylphenyl glycidyl ether. While the unsaturated glycidyl ethers are generally preferred, useful copolymers may also be made with monoepoxides of dienes or polyenes such as butadiene, methylene monoxide, chloroprene monoxide, 3,4-epoxy-1-pentene, 4,6-epoxy-2-hexene, 2-epoxy-5,9-cyclododecadiene, and the like. The third monomer which can be included in the polymers of this invention is ethylene oxide.

In the copolymers, the epihalohydrin will vary from 80 to 99 weight parts, and the glycidyl ether from about 1 to 20 weight parts In the ethylene oxide copolymers the amount of epihalohydrin will be varied from about 40 to 80 weight parts of epihalohydrin, about 15 to 45 weight parts of ethylene oxide and from about 0.1 to about 20 weight parts of unsaturated glycidyl ether or monoepoxide. Most preferably, the amount of unsaturated glycidyl ether will be from about 1 to 10 weight parts per 100 weight parts of comonomers.

The copolymers are readily prepared by polymerization in mass or solution, with catalysts normally formed by reacting an organometallic compound, preferably an organoaluminum compound such as trialkyl aluminum with water, optionally with a small amount of a chelating agent, such as acetylacetone, ethoxyacetic acid, tetrahydrofuran, and the like. The organoaluminum compounds may include triethylaluminum, tripropyl aluminum, triisobutyl aluminum, diethyl aluminum hydride, and the like. There are many patents describing the preparation of copolymers, such as U.S. Pat. Nos. 3,158,581 and 3,219,591. These copolymers normally have a number average molecular weight of greater than about 30,000, preferably 60,000, determined by Gel Permeation Chromatography.

The peroxide curative of these compositions includes any organic peroxide normally used in the curing of elastomers and polymers. Such materials include the well known benzoyl peroxide, dichlorobenzoyl peroxide, dicumyl peroxide, tertiary butyl peroxide, lauroyl peroxide, and the like; also including other diacyl peroxides as acetyl peroxide, pelargonyl peroxide, peroxyesters including tertiarybutyl peroxyacetate, tertiarybutyl peroxyisobutyrate, tertiarybutyl peroxypivalate, alkyl peroxides such as bis-tertiarybutyl peroxydiisopropyl benzene, dicumyl peroxide, hydroperoxides such as cumene hydroperoxide, acetyl cyclohexyl sulfinyl hydroperoxide, peroxydicarbonates, and the like. The amounts used preferably are greater than 0.1 weight part per 100 weight parts of copolymer, more normally, about 0.5 to 10 weight parts and preferably 1 to 3 weight parts.

Another essential ingredient in order to obtain a stable peroxide cure of the copolymers of this invention is an acid acceptor, for example, magnesium oxide, red lead, potassium and sodium stearate, lead carbonate, calcium oxide, barium carbonate, magnesium silicate, dibasic lead phosphite and generally componds of Group IA, as Na and K; Mg, Ca, Sr and Ba; and Group IVA, as Pb and Sn of the Periodic Table. Quite unexpectedly it was found that zinc oxide was quite unsatisfactory in the compounds of this invention and contributed to deterioration of the compounds. The compounds may be a salt (particularly a fatty acid salt such as sodium, potassium, calcium stearate, oleate and the like), a chelate, a carbonate, oxide, silicate, phosphate, phthalate, salicylate, fatty acid, and many others. Such compounds include, more specifically, red lead ($Pb_2O_4$), lead oxide (litharge), magnesium oxide, stannous and stannic oxides, calcium oxide, calcium carbonate, magnesium benzoate, calcium benzoate, strontium salicylate, lead oleate, dibasic lead stearate, dibasic lead phosphite, other carboxylic acid salts as tribasic lead maleate, dibasic lead phathalate, the carbamates, and the like.

The amounts used are greater than about 0.1 weight part per 100 weight parts of copolymer, and more preferably, about 0.5 to about 10 weight parts. Although larger amounts may be used, they are not necessary.

There may be used in place of, but more preferably in conjunction with, the inorganic Group IA, IIA and IVA compounds defined hereinabove, certain polyfunctional unsaturated compounds, more preferably, difunctional unsaturated compounds including allyl and methacrylate compounds such as diallyl phthalate, triallyl isocyanurate, triallyl cyanurate, triallyl phosphate, and the like, and polyfunctional methacrylates including, for example, allyl methacrylate, tetrahydrofurfuryl methacrylate, triethylene glycol dimethacrylate, ethylene dimethacrylate, tetraethylene glycol dimethacrylate, polyethylene glycol dimethacrylate, diethylene glycol dimethacrylate, 1,6-hexanediol dimethacrylate, polyethylene glycol dimethacrylate, 1,3-butylene glycol dimethacrylate, trimethylolpropane trimethacrylate, and the like. The amounts of these materials normally used will vary from about 0 to 10 weight parts per 100 weight parts of copolymer but for harder compounds, amounts of 20 or more weight parts may be used.

The vulcanizates may include a reinforcing pigment such as any of the low, medium and high structure carbon blacks, fine calcium silicate, silica, and the like. The proportion of filler may range from as low as about 5 to about 200 parts/et. for every 100 parts/et. of total rubbery ingredients (hereinafter "PHR") in the compositions. A most preferred range for nonblack fillers is from about 20 to about 150 PHR and for carbon blacks from about 15 to about 150 PHR.

In addition to the above essential and named highly preferred ingredients, the rubber vulcanizates should otherwise be compounded in accordance with known rubber compounding principles by the inclusion of the required proportions of pigments, lubricants, plasticizers, softeners, stabilizers, antioxidants, antiozonants, tackifiers, diluents, and others to suitably prepare the stock for the particular processing, shaping, forming, and/or article building operations envisaged.

The compositions may be prepared and cured by any conventional method. For example, the compositions may be prepared by mill-mixing or by Banbury mixing. Usually, the last addition of ingredients is one of the curatives and this may be effected on a cool rubber mill having water-cooled rolls or in a second pass through a cool Banbury to avoid scorching (or precuring) the composition. Once mixing is complete the stock may be sheeted off the rubber mill ready for the final molding, extruding, calendering, etc., operations.

The resulting uncured compositions are heated, preferably under confinement or in pressurized steam, at elevated temperatures between about 250° F. to about 475° F. with from about 325° to 400° F. being more preferred. Depending both on the choice and proportions of the curatives and on the temperature in the above ranges, vulcanization is usually complete in a matter of a few minutes ranging from about 2 to 60 minutes. Vulcanization occurs with the production of strong, elastic compositions of good dimensional and chemical stability and good resistance to low temperature in the presence of hydrocarbon fuels in a wide range of environments.

The invention will now be described more fully with reference to a number of specific examples, which are intended as being illustrative only rather than as limiting the invention.

EXAMPLE I

A terpolymer of 57 weight percent epichlorohydrin, 39 weight percent ethylene oxide and 4 weight percent allyl glycidyl ether was compounded on a mill with 1 weight part stearic acid, 1 weight part nickel diisobutyldithiocarbamate, 0.5 weight part of nickel dimethyldithiocabamate, 20 weight parts of HAF furnace black and 30 weight parts of FEF furnace black and 11 weight parts of dibutoxyethoxy ethyl adipate. This masterbatch was then compounded with varying amounts of dibasic lead phosphite, trimethylol propane trimethacrylate and dicumyl peroxide and tested for cure rate in the Monsanto Rheometer and vulcanizates tested for compression set. The amounts of the curing agents and test results obtained are set forth in the data table below. All parts are weight parts. For further comparison, a copolymer of 65 weight percent epichlorohydrin and 35 weight percent ethylene oxide was compounded as set forth in the tables and listed.

TABLE I

| Compound | 1 | 2 | 3 | 4 | 5 | 6 | 7 |
|---|---|---|---|---|---|---|---|
| Copolymer Masterbatch | 163.5 | 163.5 | — | — | — | — | — |
| Terpolymer Masterbatch | — | — | 163.5 | 163.5 | 163.5 | 163.5 | 163.5 |
| Dibasic lead phosphite | — | 2 | — | 2 | — | 2 | 2 |
| Trimethylolpropane trimethacrylate | — | — | — | — | 10 | 10 | 5 |
| Dicumyl peroxide[1] | 5 | 5 | 5 | 5 | 5 | 5 | 5 |
| Monsanto Rheometer, 1° Arc, 100 cpm, Micro Die, 320° F., ASTM-D 2084 | | | | | | | |
| $M_L$, in . lbsf | | | | 6.5 | 4.6 | 4.3 | 6.8 |
| $M_{HR}$, in . lbsf | Reverts quickly | Reverts slowly | Reverts quickly | 18 | 29.8 | — | — |
| $M_{HF}$, in . lbsf | | | | — | — | 47 | 32.8 |
| $t_s^2$, minutes | | | | 2.6 | 1.4 | 1.4 | 1.5 |
| $t'_c{}^{90}$, minutes | | | | 14.5 | 3.5 | 10.5 | 10.7 |
| Cure Rate, in . lbsf/min. | | | | 1.1 | 16.4 | 12.5 | 6.0 |
| Compression Set, Method B, Buttons Cured at 320° F., ASTM-D 395 | | | | | | | |
| Cure Time, minutes | — | — | — | 15 | 4 | 11 | 11 |
| 22 hours at 212° F., % | — | — | — | 33 | 70 | 24 | 28 |
| 22 hours at 302° F., % | — | — | — | 86 | 94 | 67 | 69 |

[1] 40% active Dicumyl peroxide

When this Example is repeated with 3 weight parts each of calcium oxide, magnesium silicate, potassium stearate and zinc stearate in separate compounds in place of the phosphite, the following results were obtained.

TABLE II

| | Calcium oxide | Magnesium silicate | Potassium stearate | Zinc stearate |
|---|---|---|---|---|
| Monsanto Rheometer, 1° Arc, 100cpm, Micro Die, 320° F. | | | | |
| $M_L$, in . lbsf | 8.0 | 6.0 | 6.0 | 6.0 |
| $M_{HR}$, in . lbsf | — | 18.5 | — | 17.5 |
| $M_{HF}$, in . lbsf | 35.0 | — | 25.0 | — |
| $t_s^2$, minutes | 1.5 | 1.8 | 1.7 | 2.0 |
| $t'_c{}^{90}$, minutes | 11.3 | 3.7 | 9.5 | 7.2 |
| Cure Rate, in . lbsf/min. | 8.0 | 6.2 | 4.3 | 3.0 |

EXAMPLE II

A copolymer of 96% epichlorohydrin and 4% allyl glycidyl ether and another copolymer of 92% epichlorohydrin and 8% allyl glycidyl ether were each compounded to the recipe of Example I and the following data obtained on these compounds.

|  | 96% ECH 4% AGE | 92% ECH 8% AGE |
|---|---|---|
| Monsanto Rheometer, 1° Arc, 100 cpm, Micro Die, 360° F. | | |
| $M_L$, in . lbsf | 3.5 | 3.0 |
| $M_{HF}$, in . lbsf | 8.8 | 19.5 |
| $t_s^2$, minutes | 1.3 | 1.0 |
| $t'^{90}_c$, minutes | 3.7 | 5.3 |
| Cure Rate, in . lbsf/min. | 2.0 | 5.7 |
| Originals Cured - 8'/360° F. | | |
| 100% Modulus, psi | 100 | 300 |
| 300% Modulus, psi | 380 | 1350 |
| Tensile, psi | 800 | 1650 |
| Elongation, % | 610 | 370 |
| Hardness A, pts. | 37 | 52 |
| Compression Set, Method B, Buttons | | |
| 22 hrs. @ 212° F., % | 18 | 26 |

EXAMPLE III

A terpolymer of 57 weight percent epichlorohydrin, 39 weight percent ethylene oxide and 4 weight percent allyl glycidyl ether was compounded on a mill with 1 weight part stearic acid, 1 weight part nickel diisobutyldithiocarbamate, 0.5 weight part of nickel dimethyl-thiocarbamate, 20 weight parts of HAF furnace black and 30 weight parts of FEF furnace black and 11 weight parts of dibutoxyethoxy ethyl adipate. Portions of this masterbatch were then compounded with varying amounts of dibasic lead phosphite, magnesium oxide, trimethylol propane trimethacrylate and dicumyl peroxide and tested for Mooney scorch, for cure rate in the Monsanto Rheometer, vulcanized at 320° F. and the vulcanizates tested for stress/strain; compression set, air and fuel aging properties. The amounts of these agents and test results obtained are set forth in the data table below. All parts are weight parts.

A further unexpected advantage of this ivention is that blends of copolymers of the epihalohydrin and unsaturated glycidyl ether and other elastomers are readily cocured with peroxide cures. Such elastomers include unsaturated elastomers such as natural rubber and polyisoprene and the butadiene polymers including polybutadiene, butadienestyrene copolymers, butadiene-acrylonitrile copolymers, butadiene-acrylate copolymers and other butadiene copolymers of a type known to those skilled in the art; polychloroprene; olefin polymers including polyethylene, chlorinated polyethylene, chlorosulfonated polyethylene, ethylene and propylene copolymers including ethylene and propylene or butene-1 copolymers containing unsaturation such as copolymers with dicyclopentadiene, ethylidene norbornene, and the like. Polysulfide rubbers also form curable blends with these materials.

In preparing such blends they may be made on a mill, in an internal mixer, from solution, latices, dispersions, and the like. The proportions may be varied from about 5 to 95 weight percent of the epichlorohydrin copolymers of this invention with 95 to 5 weight percent of a peroxide curable polymer or elastomer. More preferably, about 10 to 75 weight percent of the epihalohydrin

TABLE III

| Compound | 1 | 2 | 3 | 4 | 5 | 6 | 7 |
|---|---|---|---|---|---|---|---|
| Masterbatch | 163.5 | | | | | | |
| Dibasic lead phosphite | — | 2 | — | 2 | 2 | — | — |
| Magnesium oxide[1] | — | — | — | — | — | 2 | 2 |
| Trimethylol propane trimethacrylate | — | — | 10 | 10 | 5 | 5 | — |
| Dicumyl peroxide[2] | 5 | 5 | 5 | 5 | 5 | 5 | 5 |
| [1] - 70% magnesium oxide | | | | | | | |
| [2] - 40% dicumyl peroxide | | | | | | | |
| Mooney Scorch, Large Rotor, 250° F. | | | | | | | |
| Minimum | — | 46 | 30 | 32 | 45 | 40 | 46 |
| Minutes, $T_5$ | — | 22.5 | 13 | 14 | 12 | 9 | 14 |
| Specific Gravity | — | 1.40 | 1.38 | 1.39 | 1.40 | 1.39 | 1.39 |
| Monsanto Rheometer, 1° Arc, 100 cpm, Micro Die, 320° F. | | | | | | | |
| $M_L$, in-lbs. f | <1.5 | 6.5 | 4.6 | 4.3 | 6.8 | 5.5 | 6.0 |
| $M_{HF}$, in-lbs. f | — | 18 | — | 47 | 32.8 | — | — |
| $M_{HR}$, in-lbs. f | — | — | 29.8 | — | — | 27.5 | 11.8 |
| $t_s^2$, Mins. | — | 2.6 | 1.4 | 1.4 | 1.5 | 1.2 | 2.3 |
| $t_c^{90}$, Mins. | — | 14.5 | 3.5 | 10.5 | 10.7 | 4.6 | 5.6 |
| Cure Rate | — | 1.1 | 16.4 | 12.2 | 6.0 | 11.5 | 1.7 |
| 320° F. Cure - Cure Time - Min. | — | 15 | 5 | 11 | 11 | 50 | 6 |
| 100% Modulus - psi | — | 140 | 470 | 870 | 360 | 420 | 80 |
| Tensile strength - psi | — | 1250 | 1390 | 1720 | 1640 | 1510 | 790 |
| Elongation - % | — | 780 | 400 | 230 | 370 | 400 | 1000 |
| Hardness A | — | 42 | 57 | 68 | 57 | 54 | 34 |
| Compression Set | | | | | | | |
| 22 hrs/220° F. - % | — | 33 | 70 | 24 | 28 | 61 | 94 |
| 22 hrs/302° F. - % | — | 86 | 94 | 67 | 67 | 90 | 119 |
| Oven Aged Air - 70 hrs/275° F. | | | | | | | |
| Tensile - psi | — | 1230 | 1060 | 1690 | 1780 | 1270 | 480 |
| % Change | — | −2 | −24 | −2 | +9 | −16 | −39 |
| Shore Hardness A | — | 51 | 74 | 73 | 61 | 56 | 37 |
| Hardness Change - points | — | +9 | +17 | +5 | +4 | +2 | +3 |
| 180° Bend | — | pass | pass | pass | pass | pass | pass |
| Fuel C-Aged 24 hrs/R.T. | | | | | | | |
| Tensile - psi | — | 810 | 690 | 980 | 980 | 840 | 450 |
| % Tensile change | — | −35 | −50 | −43 | −40 | −44 | −43 |
| Shore Hardness A | — | 30 | 44 | 56 | 45 | 41 | 15 |
| Hardness Change - points | — | −12 | −13 | −12 | −12 | −13 | −19 |
| % Volume change | — | +33 | +29.9 | +29.3 | +29.6 | +31.4 | +33.7 |
| 180° Bend | — | pass | pass | pass | pass | pass | pass | unsaturated glycidyl ether or monoepoxide copolymers with 90 to 25 weight percent of a peroxide vulcanizable elastomer. Representative convulcanizable blends are set forth in the following examples.

EXAMPLE IV 25 weight parts of a copolymer of 57 weight percent epichlorohydrin, 39 weight percent ethylene oxide and 4 weight percent allyl glycidyl ether was mixed with 75 weight parts of chlorinated polyethylene containing 36 weight parts chlorine and having a Mooney of 70 ML, 12 weight parts of basic silicate of white lead, 0.1 weight part of 1,2-dihydro-2,2,4-trimethylquinoline, 85 weight parts of carbon black, 10 weight parts of dioctyl phthalate, 10 weight parts of epoxidized soybean oil, 3.3 weight parts of triallyl cyanurate and 7 weight parts of 40% dicumyl peroxide. This composition was tested in the Monsanto Rheometer and then vulcanized and tested for stress/strain low temperature, air and fuel aging, with the following results:

|  | 100 CIPE | 75 CIPE |
|---|---|---|
| Monsanto Rheometer, 1° Arc, 100 cpm, Micro Die, 320° F. | | |
| $M_L$, in . lbsf | 9.5 | 9.8 |
| $M_{HF}$, in . lbsf | 42 | 38 |
| $t_s^2$ minutes | 2.3 | 2.8 |
| $t_c$ 90 minutes | 24.5 | 22.5 |
| Cure Rate, in . lbsf/min. | 2.6 | 2.2 |
| Originals Cured in Open Steam 45'/320° F. | | |
| 100% Modulus, psi | 920 | 730 |
| Tensile, psi | 2360 | 1730 |
| Elongation, % | 180 | 180 |
| Hardness A, pts. | 74 | 67 |
| Gehman Low Temperature Torsion Test | | |
| ASTM D1053 | 145 | 156 |
| $T_2^o$, °C. | −3.5 | −4.5 |
| $T_5$, °C. | −14.5 | −18 |
| $T_{10}$, °C. | −18.5 | −21.5 |
| $T_{50}$, °C. | −25 | −28.5 |
| $T_{100}$, °C. | −27 | −31 |
| $T_{100}$, °F. | −16.6 | −23.8 |
| Air Test Tube Aged 70 Hours/302° F. | | |
| Tensile, psi | 2040 | 1880 |
| Tensile Change, % | −10 | +8 |
| Elongation, % | 110 | 120 |
| Elongation Change, % | −39 | −33 |
| Hardness A, pts. | 81 | 79 |
| Hardness Change, pts. | 7 | +12 |
| 180° Bend | Pass | Pass |
| Fuel B Aged 24 Hours/Room Temperature | | |
| Tensile, psi | 1390 | 1010 |
| Tensile Change, % | −41 | −36 |
| Elongation, % | 130 | 150 |
| Elongation Change, % | −28 | −17 |
| Hardness A, pts. | 74 | 72 |
| Hardness Change, pts. | 0 | +5 |
| Volume Change, % | +49 | +39 |
| 180° Bend | Pass | Pass |

EXAMPLE V

Another polymer blend was prepared from 75 weight percent of the epichlorohydrin copolymers of Example III, 25 weight parts of a butadiene/acrylonitrile copolymer containing 32% acrylonitrile and having an 80 ML Mooney, 5 weight parts of dibasic lead phosphite, 0.5 weight parts of nickel dibutyl dithiocarbamate, 20 weight parts of HAF furnace black, 30 weight parts of FEF furnace black, 5 weight parts of a nonextractable polyester plasticizer identified as ParaPlex G50, 0.5 weight parts of processing wax and 1.2 weight parts of dicumyl peroxide. The Mooney scorch was determined along with stress/strain as follows:

| Mooney Scorch, Large Rotor, 250° F. | |
|---|---|
| Minimum, visc. | 59 |
| $t_5$, minutes | 16 |
| Originals Cured 3'/375° F. | |
| 100% Modulus, psi | 350 |
| 300% Modulus, psi | 1630 |
| Tensile, psi | 1710 |
| Elongation, % | 310 |
| Hardness A, pts. | 52 |

EXAMPLE VI

A three polymer blend of 15 weight percent of the epichlorohydrin copolymer of Example III, 18 weight parts of a 50 ML Mooney, 28% acrylonitrile/butadiene copolymer, 67 weight parts of an ethylene/propylene copolymer containing 60% ethylene and about 3% ethylidene norbornene, 1 weight part of stearic acid, 85 weight parts of HAF furnace black, 10 weight parts of conductive carbon black, 25 weight parts of a naphthenic processing oil, 10 weight parts of dioctyl phthalate, 2 weight parts of dibasic lead phosphite, 5 weight parts of the polymethacrylate of the Examples and 7.0 weight parts of 40% dicumyl peroxide. The Mooney scorch and stress/strain properties were:

| Mooney Scorch, Large Rotor, 250° F. | |
|---|---|
| Minimum, visc. | 45 |
| $t_5$, minutes | 18.5 |
| Originals Cured 1.5'/400° F. | |
| 100% Modulus, psi | 830 |
| Tensile, psi | 1510 |
| Elongation, % | 180 |
| Hardness A, pts. | 73 |

EXAMPLE VII

A blend was prepared of 70 weight parts styrene/butadiene rubber having a Mooney of 50 ML and containing 23.5% styrene, 30 weight parts of the epichlorohydrin of Example III, 1 weight part stearic acid, 65 weight parts of HAF furnace black, 15 weight parts conductive carbon black, 17 weight parts of naphthenic processing oil, 13 weight parts dioctyl phthalate, 1.4 weight parts of magnesium oxide, 2 weight parts of the polymethacrylate and 3 weight parts of 40% dicumyl peroxide. The Mooney scorch and stress/strains are set forth below:

| Mooney Scorch, Large Rotor, 250° F. | |
|---|---|
| Minimum, visc. | 42 |
| $t_5$, minutes | 11 |
| Originals Cured 1.5'/400° F. | |
| 100% Modulus, psi | 400 |
| Tensile, psi | 1650 |
| Elongation, % | 240 |
| Hardness A, pts. | 61 |

These compositions, when heated so as to obtain a cured vulcanizate, have good aging properties, compression set, resistance to solvents, in addition to a valuable balance of other desirable physical properties and find utility in aircraft, automotive and mechanical goods, packings, wiring and cable jackets, hose and belting, and the like. The low permeability, high resilience and flexibility over a wide range of temperature allows use in low temperature oil resistant and ozone resistant applications. Typical uses are in fuel pump diaphragms, oil seals, paper mill and printing rolls and molded mechanical parts.

I claim:

1. A composition comprising a polymer of an epihalohydrin and an unsaturated glycidyl ether of the general formula

wherein R is an ethylenically unsaturated radical, an acid acceptor an unsaturated polyfunctional methacrylate and a curing agent consisting an organic peroxide.

2. A composition of claim 1 wherein the polymer contains 80 to 99% epichlorohydrin and 1 to 20% glycidyl ether.

3. A composition of claim 2 wherein the epihalohydrin is epichlorohydrin present in amounts of about 40 to 80 weight percent, there is about 15 to about 45 weight percent ethylene oxide, and from about 0.1 to about 20 weight percent of the unsaturated glycidyl ether copolymerized together, the acid acceptor is Group IA, IIA, or Group IVA compound present in amounts of greater than 0.1 to about 10 weight parts and containing some unsaturated polyfunctional methacrylate in amount up to 20 weight parts and greater than 0.1 to about 10 weight parts of a curing agent consisting of an organic peroxide per 100 weight parts of copolymer.

4. A composition of claim 3 wherein R of the unsaturated glycidyl ether is vinyl, allyl or alkenyl.

5. A composition of claim 4 wherein there is 1 to 10 parts of a polyunsaturated methacrylate selected from the group consisting of trimethylolpropane, trimethacrylate, ethylene dimethacrylate, and 1,3-butylene glycol dimethacrylate.

6. A composition of claim 4 containing about 1 to 10 weight parts of allyl glycidyl ether, and about 0.5 to about 10 weight parts of magnesium oxide and about 1 to 10 weight parts of trimethylol propane trimethacrylate.

7. A composition of claim 4 containing about 1 to 10 weight parts of allyl glycidyl ether, and about 0.5 to about 10 weight parts of dibasic lead phosphite and about 1 to 10 weight parts of trimethylol propane trimethacrylate.

8. A composition of claim 6 wherein the organic peroxide is an aryl hydroperoxide.

9. A composition of claim 7 wherein the organic peroxide is an aryl hydroperoxide.

10. A composition of claim 5 containing about 1 to 10 weight parts of allyl glycidyl ether, about 0.5 to about 10 weight parts of magnesium oxide or dibasic lead phosphite and about 1 to 10 weight parts of trimethylol propane trimethacrylate and the organic peroxide is dicumyl peroxide.

11. A composition of claim 4 containing about 1 to 10 weight parts of allyl glycidyl ether, and 0.5 to about 10 weight parts of calcium oxide and about 1 to 10 weight parts of trimethylol propane trimethacrylate.

12. A composition of claim 1 containing the epihalohydrin copolymer and a peroxy curable polymer.

13. A composition of claim 2 containing the epihalohydrin copolymer and a peroxy curable polymer.

14. A composition of claim 13 wherein said polymer is an unsaturated elastomer.

15. A composition of claim 14 wherein said unsaturated elastomer contains olefinic unsaturation.

16. A composition of claim 4 containing the epihalohydrin copolymer and a peroxy curable polymer.

17. A composition of claim 16 wherein there is present from 5 to 95 weight percent each of said copolymer and elastomer.

18. A composition of claim 17 wherein said elastomer is a diene containing elastomer.

19. A composition of claim 18 wherein said polymer is an olefin polymer.

20. A composition of claim 19 wherein said polymer is a copolymer of butadiene.

21. A composition of claim 20 wherein said polymer is a chlorinated polyolefin.

22. A composition of claim 21 wherein said polymer is a polymer of ethylene and propylene.

23. A composition of claim 4 containing about 1 to 10 weight parts of allyl glycidyl ether, and 1.5 to about 10 weight parts of calcium oxide and about 1 to 10 weight parts of trimethylol propane trimethacrylate.

* * * * *

REEXAMINATION CERTIFICATE (449th)
United States Patent [19]
Oetzel

[11] B1 4,251,648
[45] Certificate Issued Jan. 28, 1986

[54] PEROXIDE CURED EPIHALOHYDRIN POLYMERS

[75] Inventor: John T. Oetzel, Elyria, Ohio

[73] Assignee: The B. F. Goodrich Company, Akron, Ohio

Reexamination Request:
No. 90/000,634, Sep. 21, 1984

Reexamination Certificate for:
Patent No.: 4,251,648
Issued: Feb. 17, 1981
Appl. No.: 810,654
Filed: Jun. 27, 1977

[51] Int. Cl.$^4$ .............................................. C08G 65/32
[52] U.S. Cl. .................................. 525/187; 523/427; 523/457; 525/393

[56] References Cited

U.S. PATENT DOCUMENTS

4,032,479  6/1977  Bunnomori et al. ............... 260/2 A

FOREIGN PATENT DOCUMENTS

48-60751  8/1973  Japan .
48-37334  11/1973  Japan .
51-126248  11/1976  Japan .

OTHER PUBLICATIONS

Bulletin of The Sartomer Company–Methacrylate Monomers as Used in the Peroxide Vulcanization of Ethylene–Propylene Terpolymer, EPDM. (1068/2M)–p. 1, col. 1.

*Primary Examiner*—Paul R. Michl

[57] ABSTRACT

Compositions containing copolymers of epihalohydrins, an unsaturated epoxy comonomer, and optionally, ethylene oxide are readily cured to useful articles with peroxides when such compounds contain an acid acceptor. Covulcanizable compositions are prepared from mixtures of the epihalohydrin and epoxy copolymers with peroxy vulcanizable polymers.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 7, 11–13, 16 and 23 are cancelled.

Claims 1, 3–5, 8, 9, 14 and 17 are determined to be patentable as amended.

Claims 2, 10, 15 and 18–22, dependent on an amended claim, are determined to be patentable.

New claims 24–30 are added and determined to be patentable.

1. A composition comprising a polymer of an epihalohydrin and an unsaturated ether of the general formula

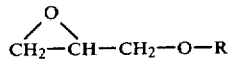

wherein R is an ethylenically unsaturated radical[,]; an acid acceptor *selected from the group consisting of Group IA, IIA, IVA compounds, and mixtures thereof, but excluding lead oxides*[,]; an unsaturated polyfunctional methacrylate; and a curing agent consisting an organic peroxide.

3. A composition of claim 2 wherein the epihalohydrin is epichlorohydrin present in amounts of about 40 to 80 weight percent, there is about 15 to about 45 weight percent ethylene oxide, and from about 0.1 to about 20 weight percent of the unsaturated glycidyl ether copolymerized together, the acid acceptor is [Group IA, IIA, or Group IVA compound] present in amounts greater than 0.1 to about 10 weight parts and containing some unsaturated polyfunctional methacrylate in amount up to 20 weight parts and greater than 0.1 to about 10 weight parts of a curing agent consisting of an organic peroxide per 100 weight parts of copolymer.

4. A composition [of claim 3] *having flat torque comprising a polymer of an epihalohydrin and an unsaturated glycidyl ether of the general formula*

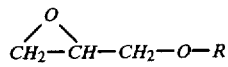

wherein R [of the unsaturated glycidyl ether] is vinyl, allyl or alkenyl; *acid acceptor selected from the group consisting of salts, chelates, carbonates, oxides, silicates, phosphates, phthalates, salicylates, and fatty acids of the elements of Groups IA, IIA and IVA of the Periodic Table, except lead oxides; an unsaturated polyfunctional methacrylate; and a curing agent consisting an organic peroxide.*

5. A composition of claim [4] *1* wherein there is 1 to 10 parts of a polyunsaturated methacrylate selected from the group consisting of trimethylolpropane[,] trimethacrylate, ethylene dimethacrylate, and 1,3-butylene glycol dimethacrylate; *and wherein the acid acceptor is selected from the group consisting of magnesium oxide, stannous oxide, stannic oxide, calcium oxide, lead carbonate, barium carbonate, calcium carbonate, magnesium silicate, magnesium benzoate, calcium benzoate, strontium salicylate, lead oleate, potassium stearate, sodium stearate, calcium stearate, sodium oleate, potassium oleate, calcium oleate, dibasic lead stearate, dibasic lead phosphite, dibasic lead phthalate, tribasic lead maleate, the carbamates, and mixtures thereof.*

8. A composition of claim [6] *24* wherein the organic peroxide is an aryl hydroperoxide.

9. A composition of claim [7] *25* wherein the organic peroxide is an aryl hydroperoxide.

14. A composition of claim [13] *28* wherein the polymer is an unsaturated elastomer.

17. A composition of claim [16] *29* wherein there is present from 5 to 95 weight percent each of said copolymer and elastomer.

*24. A composition comprising a polymer of an epihalohydrin and 1 to 10 weight percent allyl glycidyl ether containing about 0.5 to 10 weight parts of magnesium oxide, about 1 to 10 weight parts of trimethylol propane trimethacrylate, and a curing agent consisting an organic peroxide, based on 100 weight parts of said polymer.*

*25. A composition comprising a polymer of an epihalohydrin and 1 to 10 weight percent allyl glycidyl ether containing about 0.5 to 10 weight parts of dibasic lead phosphite, about 1 to 10 weight parts of trimethylol propane trimethacrylate, and a curing agent consisting an organic peroxide, based on 100 weight parts of said polymer.*

*26. A composition comprising a polymer of an epihalohydrin and 1 to 10 weight percent allyl glycidyl ether containing about 0.5 to 10 weight parts of calcium oxide, about 1 to 10 weight parts of trimethylol propane trimethacrylate, and a curing agent consisting an organic peroxide, based on 100 weight parts of said polymer.*

*27. A composition containing an epihalohydrin copolymer and a peroxy curable polymer, said epihalohydrin copolymer comprising a polymer of an epihalohydrin and an unsaturated glycidyl ether of the general formula*

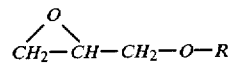

*wherein R is an ethylenically unsaturated radical, an acid acceptor, an unsaturated polyfunctional methacrylate, and a curing agent consisting an organic peroxide.*

*28. A composition containing an epihalohydrin copolymer and a peroxy curable polymer, said epihalohydrin copolymer comprising 80 to 99% epichlorohydrin and 1 to 20% unsaturated glycidyl ether of the general formula*

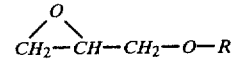

*wherein R is an ethylenically unsaturated radical, an acid acceptor, an unsaturated polyfunctional methacrylate, and a curing agent consisting an organic peroxide.*

*29. A composition containing an epihalohydrin copolymer and a peroxy curable polymer, said epihalohydrin copolymer comprising about 40 to 80 weight percent epichlorohydrin, about 15 to 45 weight percent ethylene oxide,* and about 0.1 to 20 weight percent of an unsaturated glycidyl ether of the general formula

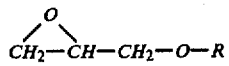

wherein R is vinyl, allyl or alkenyl, containing 0.1 to 10 weight parts acid acceptor selected from Group IA, IIA, and IVA compounds, from a small amount up to 20 weight parts unsaturated polyfunctional methacrylate, and greater than 0.1 to 10 weight parts of a curing agent consisting an organic peroxide, based on 100 weight parts of said copolymer.

30. A composition comprising a polymer of an epihalohydrin and 1 to 10 weight percent allyl glycidyl ether containing 1.5 to about 10 weight parts of calcium oxide, about 1 to 10 weight parts of trimethylol propane trimethacrylate, and a curing agent consisting an organic peroxide, based on 100 weight parts of said polymer.

* * * * *